No. 780,843. PATENTED JAN. 24, 1905.
J. W. WALLACE.
APPARATUS FOR MAKING MOLDED COVERINGS.
APPLICATION FILED FEB. 25, 1904.
2 SHEETS—SHEET 1.
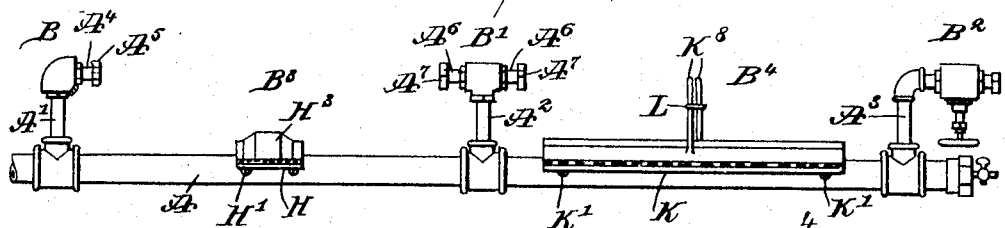
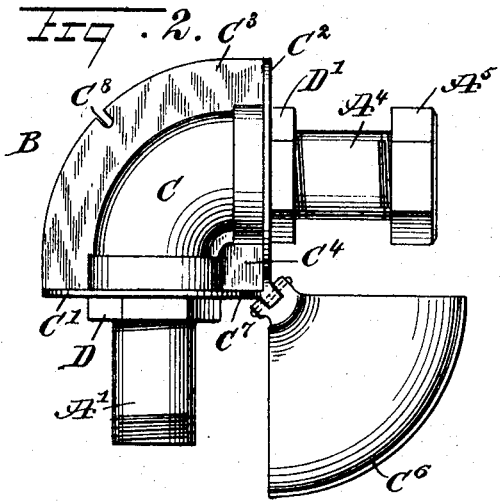 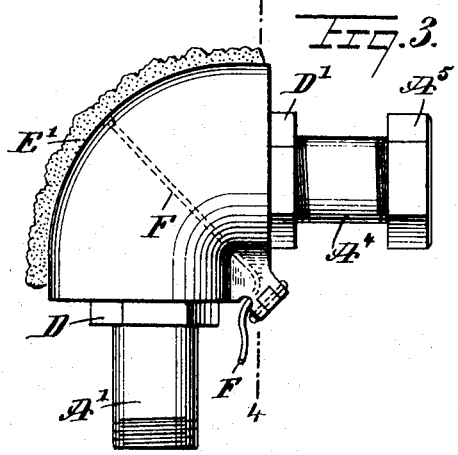
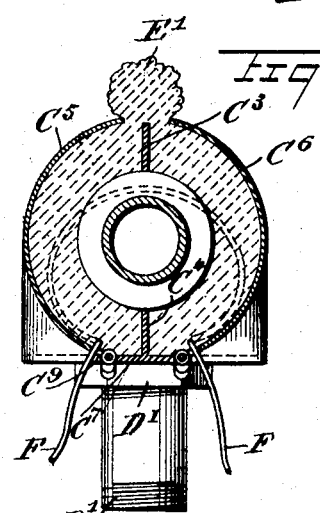 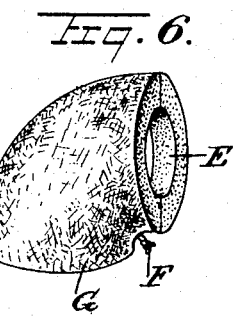 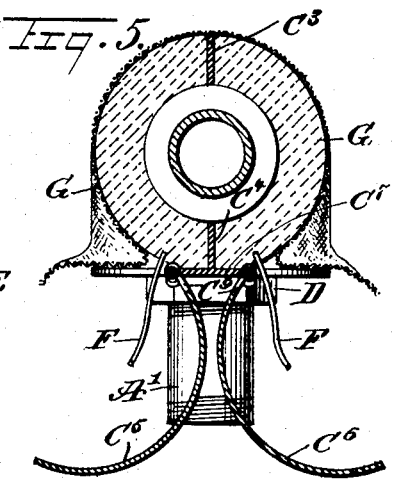
WITNESSES:
INVENTOR
John W. Wallace
BY
ATTORNEYS No. 780,843. PATENTED JAN. 24, 1905.
J. W. WALLACE.
APPARATUS FOR MAKING MOLDED COVERINGS.
APPLICATION FILED FEB. 25, 1904.
2 SHEETS—SHEET 2.
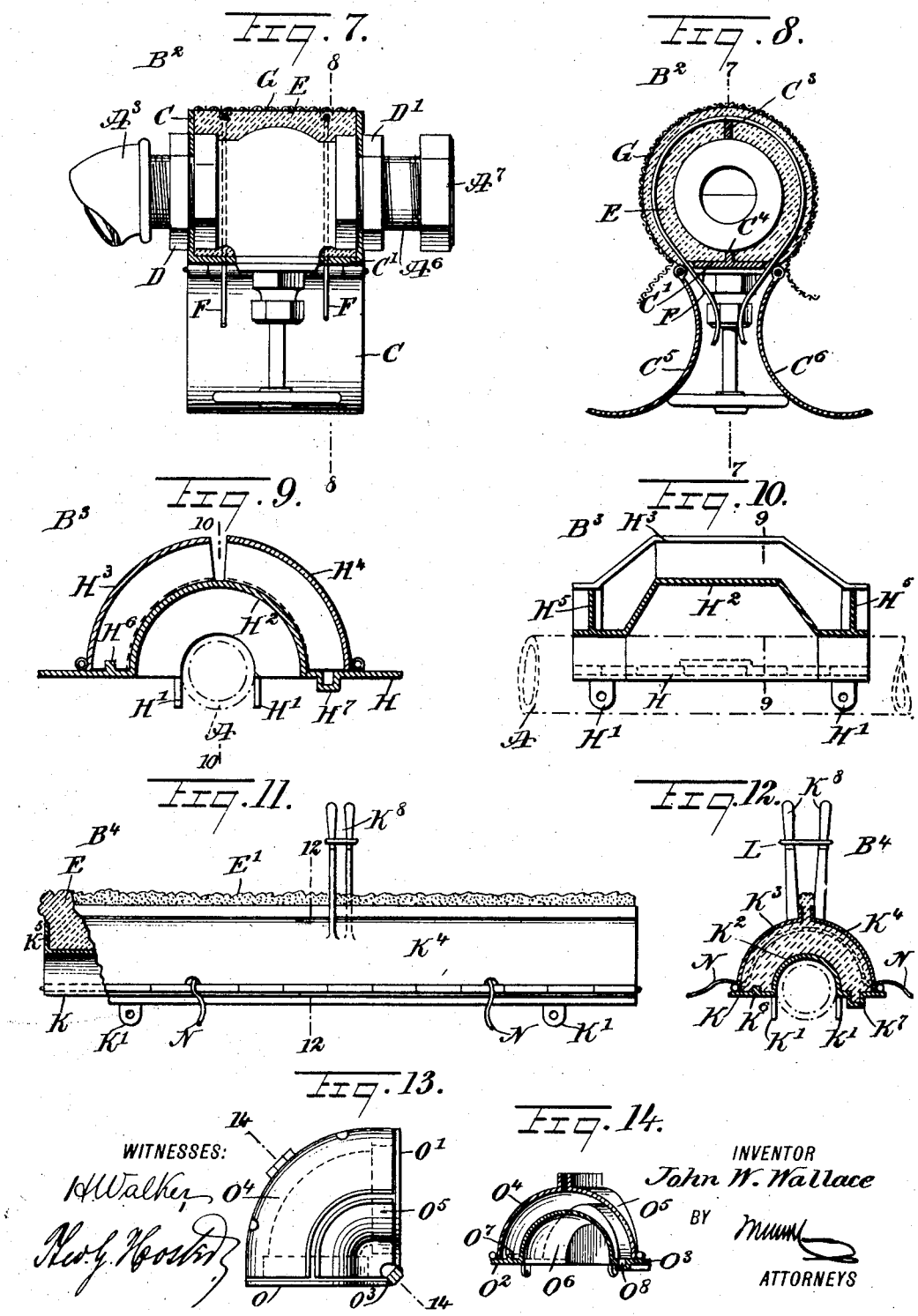

No. 780,843. Patented January 24, 1905.

UNITED STATES PATENT OFFICE.

JOHN W. WALLACE, OF RUTHERFORD, NEW JERSEY.

APPARATUS FOR MAKING MOLDED COVERINGS.

SPECIFICATION forming part of Letters Patent No. 780,843, dated January 24, 1905.

Application filed February 25, 1904. Serial No. 195,166.

*To all whom it may concern:*

Be it known that I, JOHN W. WALLACE, a citizen of the United States, and a resident of Rutherford, in the county of Bergen and State of New Jersey, have invented a new and Improved Apparatus for Making Molded Coverings, of which the following is a full, clear, and exact description.

The object of the invention is to provide a new and improved apparatus for making molded coverings for use on elbows, T's, valves, and other fittings on steam-pipes, brine-pipes, and other pipes and articles requiring insulation, the arrangement being such that the coverings can be quickly and cheaply manufactured and when finished can be conveniently applied and securely fastened in position.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of an apparatus arranged for forming coverings for elbows, T's, valves, flange-couplings, and pipes in accordance with my invention. Fig. 2 is an enlarged side elevation of the same arranged for forming elbow-coverings, the mold being shown open. Fig. 3 is a like view of the same, showing the mold closed and the insulating mass in position in the mold. Fig. 4 is a transverse section of the same on the line 4 4 of Fig. 3. Fig. 5 is a like view of the same, showing the mold open and the covering finished in the mold. Fig. 6 is a perspective view of the finished elbow-covering. Fig. 7 is a longitudinal sectional elevation of the mold for forming the valve-coverings, the mold being in an open position for the removal of the finished covering, the section being on the line 7 7 of Fig. 8. Fig. 8 is a transverse section of the same on the line 8 8 of Fig. 7. Fig. 9 is a cross-section of the mold for forming coverings for flange-couplings, the section being on the line 9 9 of Fig. 10. Fig. 10 is a longitudinal sectional elevation of the same on the line 10 10 of Fig. 9. Fig. 11 is a side elevation of the mold for forming pipe-coverings, parts being in section. Fig. 12 is a transverse section of the same on the line 12 12 of Fig. 11. Fig. 13 is a plan view of a mold for forming large-sized elbows, and Fig. 14 is a cross-section of the same on the line 14 14 of Fig. 13.

The pipe A (illustrated in Fig. 1) is connected with a boiler or other suitable heat-supply, and on the said pipe are arranged a number of branch pipes $A'$, $A^2$, and $A^3$, supporting molds B, $B'$, and $B^2$, of which the mold B is used for forming elbow-coverings, (see Figs. 2, 3, 4, 5, and 6,) the mold $B'$ is used for producing T-coverings, and the mold $B^2$ is employed for the formation of coverings for globe-valves. Any number of such branch pipes may be used on a single heat-supply pipe A for supporting various molds for forming coverings, according to the shape of the fitting on which the covering is to be used; but, if desired, each mold may have its own independent heat-supply pipe.

Directly on the heat-supply pipe A or on a branch pipe thereof are exteriorly secured molds $B^3$ and $B^4$, of which the mold $B^3$ is used for forming coverings for flange-couplings, (see Figs. 9 and 10,) while the mold $B^4$ is employed for forming sectional pipe-couplings. (See Figs. 11 and 12.)

As the mode of forming coverings for elbows, T's, valves, and like fittings is approximately the same, it suffices to describe the formation of one of the coverings in detail, and for the purpose of illustration I have selected the elbow-covering, special reference being had to Figs. 2, 3, 4, 5, and 6.

The mold B for making the elbow-covering consists of a core C, which represents or actually is the elbow or similar pipe-fitting, and with the ends of this core C is connected the branch pipe $A'$, so that the heat from the supply-pipe A passes into the core and heats the same. A mold-frame is connected with the core and consists of the end plates $C'$ and $C^2$, fitted against the ends of the core C, the plate $C'$ having an opening for the passage of the branch pipe $A'$ and the plate $C^2$ having an opening for the passage of a short pipe $A^3$, screwing in the end of the core and closed by a cap $A^5$. The plates $C'$ and $C^2$ are secured to the ends of the core by nuts D and $D'$, screwing on correspondingly-threaded portions of the pipes $A'$ and $A^4$.

The plates $C'$ and $C^2$ are connected longitudinally with each other by segmental partitions $C^3$ and $C^4$ and by a bottom or hinge plate $C^7$, on which are hinged segmental wings or pressing-plates $C^5$ and $C^6$, which when closed, as shown in Figs. 3 and 4, are concentric to the sides of the core C.

Asbestos, asbestos-cement, mineral wool, or similar insulating material is mixed with water or other liquid to form a plastic mass E, which is placed into the mold and packed against opposite sides of the core C at the time the pressing-plates $C^5$ and $C^6$ are in an open position. Immediately previous to placing the mass E in position in the mold a wire or band F is engaged with a notch $C^8$, formed in the outermost partition $C^3$, and the ends of the wire or band F are then passed through openings $C^9$, arranged in the plates $C^5$ and $C^6$ adjacent to the hinges thereof. The plates $C^5$ and $C^6$ are now swung into a closed position by the operator with sufficient force to press the plastic mass into shape on the exterior surface of the core C with the exception of the parts covered by the inner edges of the thin connecting-partitions $C^3$ and $C^4$, as will be readily understood by reference to Fig. 4. In forcing the pressing-plates $C^5$ and $C^6$ into a closed position the plastic material is not only pressed into shape, but the surplus material $E'$ is caused to escape through a space left between the adjacent free ends of the pressing-plates $C^5$ and $C^6$ directly above the partition-plate $C^3$, as indicated in Figs. 3 and 4. This surplus material $E'$ is readily scraped or trimmed off by a suitable tool. The pressing-plates $C^5$ and $C^6$ are held in a closed position sufficiently long for the heat within the core C to act on the plastic material, so as to dry and harden the same. When this has taken place, the pressing-plates $C^5$ and $C^6$ are swung open into the position shown in Fig. 5, and then a strip of canvas is placed over the external surface of the covering still held in position on the core and glued or otherwise fastened thereto, as plainly indicated in Fig. 5, and then the covering is removed from the open mold by swinging the opposite sides outward, the canvas on the top of the covering serving as a fulcrum to allow this movement of the covering which now has its composite mass E, formed of two sections, united by the embedded wire or band F and by the canvas G. The covering is now complete and can be shipped to any distant place and applied to an elbow of the same size, and when the covering is in position then the ends of the wire or band F are twisted together at the under side of the covering, as plainly indicated in Fig. 6, and the ends of the canvas G are glued or otherwise secured to the bottom portion of the covering.

From the foregoing it will be seen that a large number of coverings for elbows of a uniform size can be made in a comparatively short time, and the said coverings can be transported to buildings or other places in which elbows are used of the same size, and each of the said elbows can be readily covered by the proper covering in the manner above described.

It is understood that coverings are made of different sizes around cores C of corresponding dimensions according to the different-sized standard elbows now in use.

In making a T-covering a T-shaped core is secured on the branch pipe $A^2$, as indicated in Fig. 1, and the ends of the T are provided with short pipes $A^6$, closed by caps $A^7$, and the mold-casing, consisting of parallel end plates, a bottom plate, and longitudinally-disposed partitions and pressing-plates, incloses the T, the pipe $A^2$ extending through the bottom plate between the hinges for the pressing-plates $C^5$ and $C^6$ and the pipes $A^6$ passing through the end plates into the ends of the T. A wire or band, of which preferably two are now employed, is embedded in the plastic mass previous to closing the wings or pressing-plates, the same as above described relative to the elbow.

The covering for the valve $B^2$ (shown in Figs. 1, 7, and 8) is similarly made, so that further detailed description thereof is not deemed necessary.

For making coverings for flange-couplings, as illustrated in Figs. 9 and 10, the covering is preferably made in two sections, each section being produced in a mold having bottom plates H, provided with depending lugs $H'$, for bolting or otherwise securing the mold in place on the pipe A. (See Figs. 1 and 9.) On the bottom plates is secured a core-wall $H^2$ of a size for conveniently accommodating one-half of the flange-coupling, and on the said bottom plates H are hinged pressing-plates $H^3$ and $H^4$, approximately concentric to the core-wall $H^2$ and adapted to rest near their outer ends on transverse flanges $H^5$, extending integrally from the core-wall $H^2$, near the outer end thereof, as plainly indicated in Fig. 10. On the bottom plates H, between the core-wall $H^2$ and the pressing-plate $H^3$, is formed integrally a longitudinally-extending lug $H^6$, and a similarly-shaped longitudinal groove or recess $H^7$ is formed in the bottom plates between the core-wall $H^2$ and the other pressing-plate, $H^4$.

When the wire or band and the plastic material are in position, then the plates $H^3$ and $H^4$ are closed and held in this position until the plastic material has dried and hardened, and then the plates $H^3$ and $H^4$ are swung open and the sectional covering is removed from the mold. The sectional covering produced is provided on one edge with a longitudinal groove and on the other edge with a longitudinal tongue, formed by the projection H⁶ and the groove H⁷, respectively, in the bottom plates H of the mold.

It is understood that previous to taking the covering-section out of the mold its external surface is covered by canvas to give the desired durability to the covering-section.

When fitting two covering-sections together, the groove of one engages the tongue of the other, so that the two covering-sections are securely interlocked while in position on the flange.

It is understood that the core-plate H² is so shaped that the nuts and heads of the bolts for fastening the flanges or flange-couplings together are not touched by the covering when placed in position on the flange-coupling, and the pipe ends connected with each other by the flanges of the coupling are engaged by the ends of the covering, which fit snugly thereon, owing to the shape given the said covering by the core-plate H² at the ends thereof.

When making pipe-coverings, the mold therefor is provided with bottom plates K, having lugs K' for fastening the mold to the pipe A. The inner edges of the bottom plates K are connected with each other by a core-wall K², and on the outer ends of the said bottom plates are hinged pressing-plates K³ and K⁴, and on the terminals of the bottom plates K are secured end plates K⁵, as plainly indicated in Fig. 11. The bottom plates K are also provided with a projection K⁶ and recess or groove K⁷ for forming a tongue and groove in the finished pipe-covering.

The pipe-coverings are made in lengths of three or four feet, and in order to enable the operator to exert the necessary pressure on the plates K³ and K⁴ when pressing the material in shape in the mold it is desirable to provide the plates K³ and K⁴ with handles K⁸, adapted to be taken hold of by the operator for opening and closing the pressing-plates K³ and K⁴ of the mold.

A locking device, such as a ring L, may be employed on the upper free ends of the handle K⁸ to hold the pressing-plates K³ and K⁴ in a closed position during the drying and hardening process of the plastic mass within the mold.

Wires N are preferably embedded in the plastic mass, the same as the wires F, previously described, and the ends of the wires of two pipe-covering sections are fastened together by twisting or otherwise, so as to securely hold the sections in a closed position, the sections being interlocked by the tongues and grooves.

In Figs. 13 and 14 is illustrated a mold for making elbows of large dimensions, and in this case the mold has the end plates O and O', the diametrically-disposed partition-plates O² and O³, and the pressing-plates made of two parts O⁴ and O⁵, of which the part O⁴ is hinged to the outer end of the partition-plate O² and the part O⁵ is hinged to the partition-plate O³. In this case the elbow-covering is made in two sections divided longitudinally, and the mold has walls provided, instead of the elbow itself, as a core, with a core-plate O⁶, representing one-half of the elbow, the core-plate connecting the partition-plates O² and O³ with each other and also the end plates O and O'. The partition-plates O² and O³ are provided with a projection O⁷ and a groove or recess O⁸ for forming tongues and grooves in the sectional elbow-covering to permit interlocking of the two sections when applied to the elbow. Wire is embedded in the plastic mass for each covering-section, and the latter are also provided with canvas on the outside, as before explained in relation to the other coverings.

Having thus described my invention, I claim as new and desire to secure by Letters Patent—

1. An apparatus for forming molded coverings, comprising a heat-supply pipe, a mold secured thereon and consisting of a core representing the whole or a portion of the exterior surface of the article to be covered by the covering, end plates on the core, and hinged pressing-plates for pressing the plastic material in shape on the core and against the end plates, as set forth.

2. A mold for forming molded coverings, comprising a core representing the whole or a portion of the external surface of the article to be covered by the covering, end plates on the ends of the core, and hinged pressing-plates for inclosing the core and the plastic material and pressing the latter against the core and the end plates, as set forth.

3. A mold for forming molded coverings, comprising a core representing the external surface of the article to be covered by the covering, end plates on the ends of the core, hinged pressing-plates for inclosing the core and the plastic material and pressing the latter against the core and the end plates, and longitudinally-extending portions connecting the end plates with each other and extending over opposite sides of the core, as set forth.

4. A mold for forming molded coverings, comprising a core representing the external surface of the article to be covered by the covering, end plates on the ends of the core, hinged pressing-plates for inclosing the core and the plastic material and pressing the latter against the core and the end plates, and tongues and grooves on the inside of the mold, for forming grooves and tongues on the finished covering, as set forth.

5. A mold for forming molded coverings from a plastic material, comprising a core, a bottom plate having tongues and grooves, end plates, and hinged pressing-plates, as set forth.

6. A mold for forming molded coverings from a plastic material, comprising a core, a bottom plate, end plates integral with the said bottom plate, and pressing-plates hinged on opposite sides of the bottom plate, as set forth.

7. A mold for forming molded coverings from a plastic material, comprising a core, a bottom plate having tongues and grooves, end plates integral with the said bottom plate, and pressing-plates hinged on opposite sides of the bottom plate, as set forth.

8. A mold for forming molded coverings from a plastic material, comprising a core, a bottom plate, end plates integral with the said bottom plate, pressing-plates hinged on opposite sides of the bottom plate, and longitudinal partitions connecting the end plates with each other, one of the partitions having a notch and the pressing-plates having openings at or near their hinges, as set forth.

In testimony whereof I have signed my name to this specification in the presence of two subscribing witnesses.

JOHN W. WALLACE.

Witnesses:
THEO. G. HOSTER,
WILLIAM F. ROBINSON.